United States Patent
Cho et al.

(10) Patent No.: US 10,079,376 B2
(45) Date of Patent: Sep. 18, 2018

(54) BATTERY PACK

(71) Applicant: SAMSUNG SDI CO., LTD., Yongin-si, Gyeonggi-do (KR)

(72) Inventors: Man-Sik Cho, Yongin-si (KR); So-Ra Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 370 days.

(21) Appl. No.: 14/076,089

(22) Filed: Nov. 8, 2013

(65) Prior Publication Data

US 2014/0377591 A1 Dec. 25, 2014

(30) Foreign Application Priority Data

Jun. 25, 2013 (KR) .................. 10-2013-0073310

(51) Int. Cl.
*H01M 2/10* (2006.01)
*H01M 10/42* (2006.01)
*H01M 10/48* (2006.01)

(52) U.S. Cl.
CPC ..... *H01M 2/1061* (2013.01); *H01M 10/4257* (2013.01); *H01M 10/486* (2013.01)

(58) Field of Classification Search
CPC ..................................................... H01M 2/10
See application file for complete search history.

(56) References Cited

U.S. PATENT DOCUMENTS

| | | | | |
|---|---|---|---|---|
| 6,433,514 | B1* | 8/2002 | McClure | H01M 10/4257 320/136 |
| 6,451,474 | B1* | 9/2002 | Kozu | H01M 2/1061 429/100 |
| 2002/0139456 | A1* | 10/2002 | Kubo | C01B 3/0031 148/668 |
| 2005/0077878 | A1* | 4/2005 | Carrier | B25F 5/00 320/134 |
| 2006/0134513 | A1* | 6/2006 | Tsumura | H01M 2/0207 429/100 |
| 2008/0096100 | A1* | 4/2008 | Hagiwara | H01M 2/021 429/100 |
| 2010/0035136 | A1 | 2/2010 | Huang et al. | |

(Continued)

FOREIGN PATENT DOCUMENTS

| CN | 101651725 A | 2/2010 |
|---|---|---|
| CN | 202231077 U | 5/2012 |
| GB | 2 115 601 A | 9/1983 |

(Continued)

OTHER PUBLICATIONS

TranslateOfKR20090027393.*

(Continued)

*Primary Examiner* — Sarah A Slifka
*Assistant Examiner* — Brian R Ohara
(74) *Attorney, Agent, or Firm* — Lewis Roca Rothgerber Christie LLP

(57) ABSTRACT

A battery pack that prevents arbitrary disassembly, and yet, that can be separated, includes a battery cell, a case for accommodating the battery cell therein, and a holder enclosing the case. A first engagement portion is formed on an outer surface of the case, and a second engagement portion is formed on an inner surface of the holder for coupling with the first engagement portion.

14 Claims, 4 Drawing Sheets

(56) References Cited

U.S. PATENT DOCUMENTS

2011/0039134 A1    2/2011   Kim et al.

FOREIGN PATENT DOCUMENTS

| | | |
|---|---|---|
| JP | 1-129455 | 9/1989 |
| JP | 4-62896 | 2/1992 |
| JP | 2006-216462 A | 8/2006 |
| JP | 2006-338459 A | 12/2006 |
| JP | 2008-112654 A | 5/2008 |
| JP | 2010-027373 A | 2/2010 |
| JP | 2011-40387 A | 2/2011 |
| KR | 10-2005-0054800 A | 6/2005 |
| KR | 10-2009-0027393 A | 3/2009 |
| KR | 20090027393 A * | 3/2009 |
| KR | 20-2009-0003599 U | 4/2009 |

OTHER PUBLICATIONS

English Machine Translation of KR 20-2009-0003599 U (On Order).
EPO Search Report dated Jun. 11, 2014, for corresponding European Patent application 14160943.8, (5 pages).
SIPO Office Action, with English translation, dated Oct. 10, 2017, for corresponding Chinese Patent Application No. 201410058532.0 (26 pages).
JPO Office Action dated Dec. 25, 2017, for corresponding Japanese Patent Application No. 2014-002243 (6 pages).
Chinese Granted Document dated Jun. 22, 2018, for Chinese Patent Application No. 201410058532.0, 13 pages.

\* cited by examiner

BATTERY PACK

CROSS-REFERENCE TO RELATED APPLICATION

This application claims priority to and the benefit of Korean Patent Application No. 10-2013-0073310, filed on Jun. 25, 2013, in the Korean Intellectual Property Office, the disclosure of which is incorporated herein by reference in its entirety.

BACKGROUND

1. Field

One or more embodiments of the present invention relate to a battery pack.

2. Description of the Related Art

Various battery packs are used as power sources for portable electronic devices. As portable electronic devices are used in various fields, the demand for battery packs is rapidly increasing. The battery pack may be used and reused by being charged and discharged multiple times, and thus with economical and eco-friendly features, the use of the battery pack has been promoted.

However, because the battery pack has highly reactive material such as lithium contained therein, if the battery pack is arbitrarily disassembled, a safety accident such as an explosion may occur. Therefore, to prevent a consumer from arbitrarily disassembling the battery pack, a case for accommodating a battery cell is bonded by ultrasonic fusion.

When a case is bonded by ultrasonic fusion, if an abnormality occurs during assembly due to a failure of a complete battery pack or use of the battery pack, disassembly for repair is not easy to perform and the case bonded by fusion may not be reusable.

SUMMARY

One or more aspects of the embodiments of the present invention include a battery pack which prevents arbitrary disassembly and is easily disassembled for repair.

Additional aspects will be set forth in part in the description which follows and in part, will be apparent from the description, or may be learned by practice of the presented embodiments.

According to one or more embodiments of the present invention, a battery pack includes: a battery cell; a case comprising a first case and a second case coupled with each other, the case accommodating the battery cell therein; a holder enclosing the case; a first engagement portion at an outer surface of at least one of the first case and the second case; and a second engagement portion at an inner surface of the holder for coupling with the first engagement portion.

The first engagement portion may include a lock protrusion protruding away from the outer surface, and the second engagement portion may include a recessed portion configured to couple with the lock protrusion.

The holder may have a cavity for inserting the case such that, when the case is inserted into the cavity, the coupled first engagement portion and the second engagement portion prevent the case from separating from the holder in a direction opposite to an inserting direction of the case.

The battery pack may further include a bump on a side of the case and protrude outwardly from the case such that, when the case is inserted into a cavity of the holder, the bump prevents the case from separating from the holder in an inserting direction of the case.

The battery pack may further include a gap between the outer surface of the at least one of the first case and the second case and the inner surface of the holder, the gap being formed substantially straight from an end of the holder to the first engagement portion.

The gap may be configured such that a disassembling kit is insertable into the gap.

The holder and the case may be configured to separate from each other when the disassembling kit is inserted into the gap.

The first engagement portion may include a plurality of first engagement portions, and the second engagement portion may include a plurality of second engagement portions.

The battery pack may further include a protection circuit module accommodated in the case and electrically coupled with the battery cell.

The protection circuit module may include an external connection terminal.

According to one or more embodiments of the present invention, a battery pack may include: a holder having a cavity; a case inserted into the cavity and coupled with the holder, the case including a first case and a second case coupled with each other; a battery cell accommodated in the case; and a gap between an outer surface of at least one of the first case and the second case and an inner surface of the holder, the gap being configured such that a disassembling kit is insertable into the gap, wherein the holder and the case are configured to separate from each other when the disassembling kit is inserted into the gap.

The battery pack may further include: a first engagement portion at the outer surface of at least one of the first case and the second case; and a second engagement portion at the inner surface of the holder for coupling with the first engagement portion, wherein when the case is inserted into the cavity, the coupled first engagement portion and the second engagement portion prevent the case from separating from the holder in a direction opposite to an inserting direction of the case.

The first engagement portion may include a lock protrusion protruding away from the outer surface, and the second engagement portion may include a recessed portion.

The first engagement portion may be elastic such that the coupled first engagement portion and the second engagement portion may be configured to uncouple from each other when the disassembling kit is inserted in the gap.

The battery pack may further include a bump protruding outward from the case at a side of the case.

The bump may be configured to prevent the case from separating from the holder in an inserting direction of the case.

The gap may be a substantially straight path from an end of the holder to the first engagement portion.

The first engagement portion may include a plurality of first engagement portions, and the second engagement portion may include a plurality of second engagement portions.

The battery pack may further include a protection circuit module accommodated in the case and electrically coupled with the battery cell.

The protection circuit module may further include an external connection terminal and a temperature sensor for measuring a temperature of the battery cell.

BRIEF DESCRIPTION OF THE DRAWINGS

These and/or other aspects will become apparent and more readily appreciated from the following description of the embodiments, taken in conjunction with the accompanying drawings, of which.

DETAILED DESCRIPTION

Figure 1:
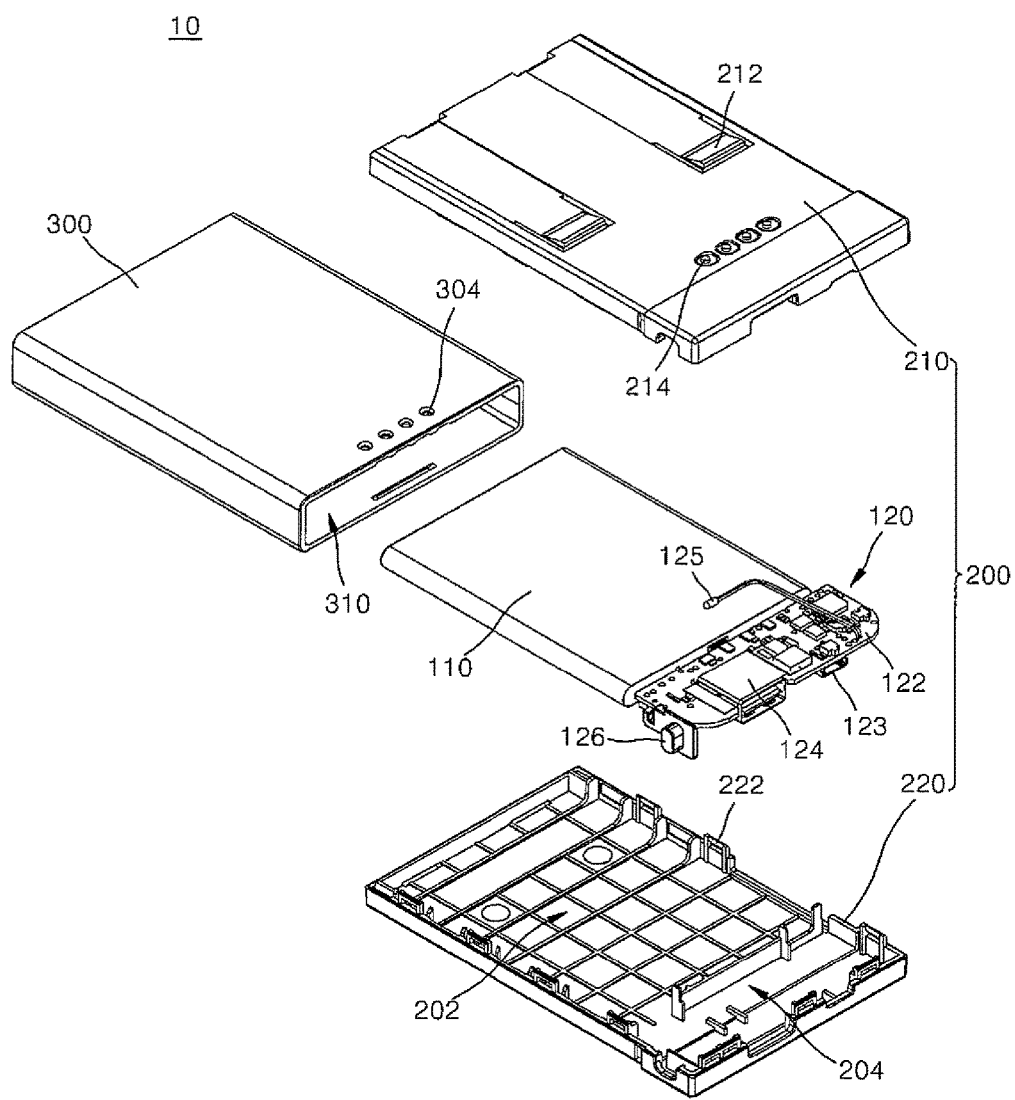
FIG. 1 is an exploded perspective view schematically illustrating a battery pack according to an embodiment of the present invention.

Hereinafter, the embodiments of the present invention may be practiced in various forms and in accordance with one or more example embodiments that are disclosed herein. The descriptions are described in more detail accompanied by illustrations of particular example embodiments shown in the drawings. However, the example description and illustrations do not constitute a limit to the claimed scope of the invention, nor the present invention to the particular embodiments, and the embodiments of the preset invention should be construed as including all changes, equivalents, and substitutions included in the spirit and scope of the present invention. Related well-known technology will not be described in detail if it obscures the subject matter of the embodiments of the present invention.

Although ordinal numbers such as "first", "second", and so forth, will be used to describe various components, those components are not limited by the terms, or the order of such terms. The terms are used for distinguishing one component from another component.

The terminology used herein is for the purpose of describing example embodiments and is not intended to be limited to the example embodiments. As used herein, the singular forms are intended to include the plural forms as well, unless the context clearly indicates otherwise. It will be further understood that the terms "comprises," "includes" and/or "has" when used in this specification, specify the presence of the stated feature, number, step, operation, component, element, or a combination thereof but do not preclude the presence or addition of one or more other features, numbers, steps, operations, components, elements, or combinations thereof.

As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present invention refers to "one or more embodiments of the present invention."

Hereinafter, the embodiments of the present invention will be described in more detail with reference to the embodiments illustrated in the accompanying drawings.

FIG. 1 is an exploded perspective view schematically illustrating a battery pack according to an embodiment of the present invention.

Referring to FIG. 1, a battery pack 10 according to an embodiment of the present invention may include a battery cell 110, a case 200 accommodating the battery cell 110, and a holder 300 enclosing the case 200.

The battery cell 110 may receive an electrode assembly therein for charging and discharging the battery cell 110. The electrode assembly may include a cathode plate and an anode plate to which an electrode active material is coated, and a separator interposed between the cathode plate and the anode plate.

For example, the electrode assembly is in the form of (or similar to) a jelly roll and may be manufactured by sequentially stacking the cathode plate, the separator, and the anode plate, and then winding the sequentially stacked structure. However, the present invention is not limited to this example, and the electrode assembly may have any suitable stacked structure in which the cathode plate, the separator, and the anode plate are stacked sequentially in this order.

A protection circuit module 120 is positioned at one end of the battery cell 110. The protection circuit module 120 is electrically coupled with the battery cell 110 to control the charging and discharging of the battery cell 110.

The protection circuit module 120 may include a substrate 122 and a plurality of electronic elements mounted on the substrate 122.

The substrate 122 may be, for example, a Printed Circuit Board (PCB) on which a circuit pattern is printed. The electronic elements may be safety elements including passive elements such as a resistor and a condenser, or active elements such as electric-field transistors, and switching elements such as Integrated Circuits (ICs).

In particular, the IC may control an operation of the electrode assembly in the battery cell 110 and may be interrupted in case of an abnormal operation of the electrode assembly.

The protection circuit module 120 may further include an external connection terminal for coupling with an external electronic device, a temperature sensor 125 for measuring the temperature of the battery cell 110, and a switch unit 126 for turning on/off the battery pack 10.

The external connection terminal may include a first connection portion 123 for supplying power to an external electronic device and a second connection portion 124 for receiving the power from the external electronic device. However, the present invention is not limited to this example, and the first connection portion 123 and the second connection portion 124 may be formed into, for example, one piece to supply the power to the external electronic device or receive the power from the external electronic device.

The temperature sensor 125 generates temperature information of a measured position of the battery cell as an electric signal and transmits the electric signal to the protection circuit module 120. For example, the temperature sensor 125 may be a thermistor. The thermistor may be, for example, a resistive thermistor in which a resistance changes based on a change in temperature. The temperature sensor 125 may be positioned to contact a surface of the battery cell 110 to accurately measure the temperature of the battery cell 110, and may be electrically coupled with the protection circuit module 120 by a cable or the like.

The switch unit 126 may turn on or off the battery pack 10. If the battery pack 10 is turned off by the switch unit 126, flow of current to the external electronic device by an external connection terminal may be blocked. Thus, during non-use of the battery pack 10, undesired consumption of power charged in the battery cell 110 may be reduced or prevented. Therefore, the battery pack 10 according to the present invention may be used as a portable charger.

The case 200 includes a first case 210 and a second case 220 which are coupled to each other, and is provided with a first receiving portion 202 for receiving (or accommodating) the battery cell 110 and a second receiving portion 204 for receiving (or accommodating) the protection circuit module 120 therein.

The first case 210 and the second case 220 may be formed of, for example, a high-polymer resin having insulating property. A hook is formed in the first case 210, and a lock hole 222 for coupling with the hook is formed in the second case 220, such that the first case 210 and the second case 220 may be easily coupled by hook coupling. As the first case 210 and the second case 220 are easily coupled by hook coupling, disassembly of the first case 210 and the second case 220 may be easily performed when compared to a case where the first case 210 and the second case 220 are bonded by ultrasonic fusion.

A first engagement portion 212 may be formed on an outer surface of the first case 210. Although two first engagement portions 212 are shown as being formed on the outer surface of the first case 210 in FIG. 1, the embodiment of the present invention is not limited to this example. That is, the first engagement portion 212 may be formed on an outer surface of the first case 210 and/or the second case 220, and one first engagement portion 212 or two or more first engagement portions 212 may be formed.

The first engagement portion 212 is a part which is separated from the outer surface of the first case 210 and protrudes outwardly from the outer surface of the first case 210. The first engagement portion 212 is coupled with a second engagement portion (302 of FIG. 3) formed on an inner surface of the holder 300, as will be described below, such that the holder 300 and the case 200 may be coupled to each other, which will be described below with reference to FIGS. 2 and 3.

In the first case 210, a lamp 214 (or light) may be provided. The lamp 214 may be electrically coupled with the protection circuit module 120 to indicate an on/off state of the battery pack 10 and a charging state of the battery cell 110. For example, four lamps 214 are shown in FIG. 1, and when the battery pack 110 is in an on state, the lamps 214 are lighted. The number of lighted lamps 214 may vary according to the charging state of the battery cell 110.

According to an embodiment, the holder 300 is formed to enclose the case 200. More specifically, the holder 300 is integrally formed along the shape of the case 200 to enclose the case 200, and has a cavity 310 for receiving (or accommodating) the case 200 therein. To slide the case 200 into the cavity 310, a pair of surfaces facing each other along a major axis of the holder 300 may be opened (e.g., may define an opening to the cavity 310).

The holder 300 is formed of a material having a rigidity such as, for example, metal to protect the battery cell 110 and the protection circuit module 120 from an external shock. To allow the lighting state of the lamp 214 (e.g., on or off) to be easily recognized, a hole 304 may be formed in a position corresponding to each lamp 214 in the holder 300.

Figure 2:
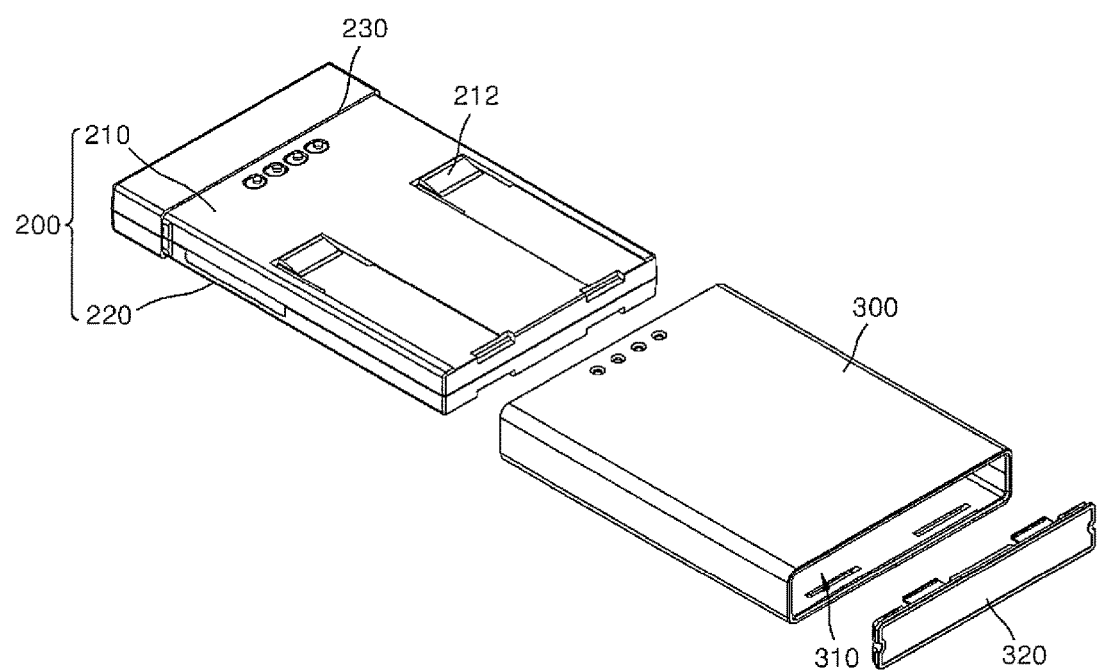
FIG. 2 is a perspective view schematically illustrating a coupling process of a battery pack of FIG. 1.
Figure 3:
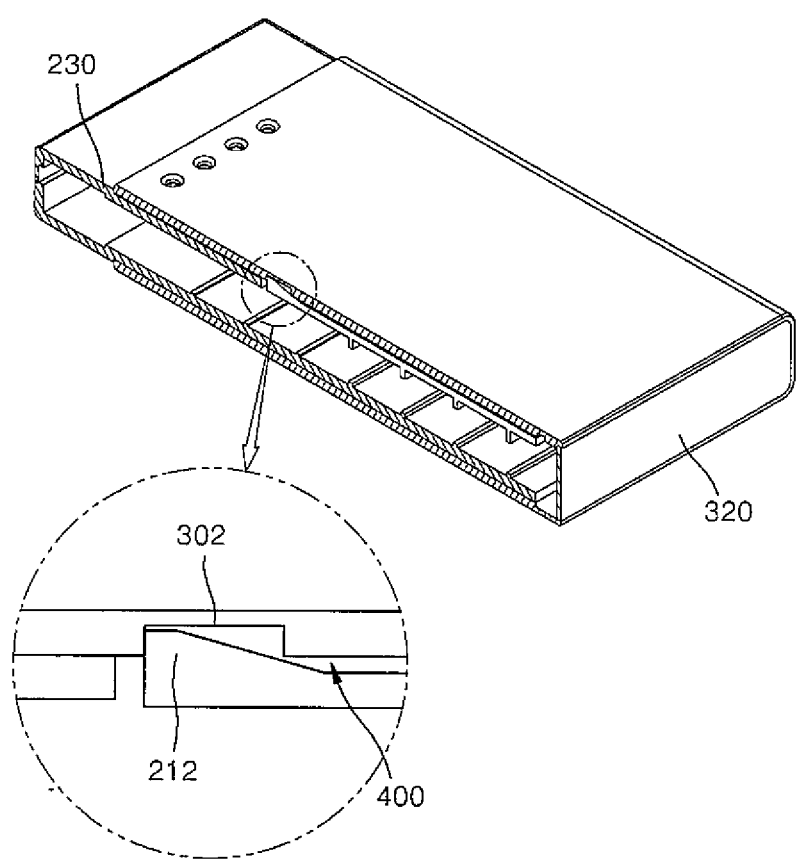
FIG. 3 is a perspective view illustrating a coupled battery pack of FIG. 1.

FIG. 2 is a perspective view schematically illustrating a coupling process (e.g., assembly process) of the battery pack 10 of FIG. 1. FIG. 3 is a perspective view illustrating a coupled (e.g., assembled) battery pack 10 of FIG. 1.

FIG. 2 shows the case 200 made by coupling the first case 210 with the second case 220, and the holder 300 for inserting the case 200 therein. FIG. 3 shows a cross-section of the case 200 being coupled with the holder 300. However, in FIG. 3, for convenience, the battery cell (110 of FIG. 1) and the protection circuit module (120 of FIG. 1) in the case 200 are not shown.

Referring to FIGS. 2 and 3, the case 200 slides in a direction to be inserted into the cavity 310 of the holder 300. To this end, the holder 300 is integrally formed along the shape of the case 200, and a pair of surfaces located perpendicularly to the inserting direction of the case 200 may be opened.

When the case 200 is inserted into the holder 300, the first engagement portion 212 formed in the case 200 and the second engagement portion 302 formed in the holder 300 are coupled to each other.

The first engagement portion 212 may be formed on the outer surface of the first case 210 and/or the second case 220. In some embodiments, one first engagement portion 212 or two or more first engagement portions 212 may be formed. However, for convenience, the present disclosure will be described with two first engagement portions 212 formed on the outer surface of the first case 210.

According to an embodiment, the first engagement portion 212 may be a lock protrusion which is separated from (or protrudes away from) the outer surface of the first case 210 and protrudes from the outer surface. More specifically, the first engagement portion 212 may be in the shape of a generally or substantially right triangle including an inclined plane having an inclination along the inserting direction of the case 200 and a vertical plane perpendicular to the inserting direction of the case 200. In some embodiments, the first engagement portion 212 is elastic.

The second engagement portion 302 may be an indented portion (e.g., a concave portion) recessed perpendicularly from the inner surface of the holder 300. The second engagement portion 302 is formed to correspond to the first engagement portion 212. That is, the number of second engagement portions 302 formed is equal to that of first engagement portions 212, and when the case 200 is inserted into the holder 300, the second engagement portion 302 corresponds with the position of the first engagement portion 212.

When the case 200 is inserted into the cavity 310 of the holder 300, the first engagement portion 212 is pressed downwardly (e.g., in the direction toward the center of the case) by the inner surface of the cavity 310, and then upon completion of insertion of the case 200, the shape of the first engagement portion 212 is restored by elasticity and thus the first engagement portion 212 is coupled with the second engagement portion 302. More specifically, the second engagement portion 302 is engaged with the vertical plane of the first engagement portion 212 in the right triangle shape, thus serving as a lock protrusion.

Therefore, the first engagement portion 212 and the second engagement portion 302 may prevent the case 200 and the holder 300 from being separated in the opposite direction to the inserting direction of the case 200.

In some embodiments, a bump 230 protruding outwardly from the case 200 is formed on the side of the case 200. The bump 230 may be formed on both the first case 210 and the second case 220, or on one of them.

The bump 230 prevents the case 200 passing through the opened side of the holder 300 from passing through the other opened side of the holder 300, when the case 200 is inserted into the cavity 310. That is, the bump 230 prevents the case 200 from being separated from (e.g., from sliding through and out of) the holder 300 in the inserting direction of the case 200.

Therefore, according to the embodiments of the present invention, by inserting the case 200 into the holder 300, the case 200 and the holder 300 may be easily coupled to each other. Moreover, it is possible to prevent, for example, the user, from arbitrarily disassembling the battery pack 10 because the first engagement portion 212 and the second engagement portion 302 is not easy to recognize (e.g., not easily visible) from outside.

According to an embodiment, a gap 400 is formed between the coupled case 200 and holder 300. The gap 400 may be formed as a substantially straight (e.g., linear) path or groove from an end of the holder 300 to the first engagement portion 212. The gap 400 is a space into which, for example, a disassembling kit (500 of FIG. 4) described below may be inserted, such that when the disassembling kit (500 of FIG. 4) is inserted into the gap 400, the case 200 and the holder 300 may be easily separated from each other, as shown in FIG. 4.

Once the case 200 is inserted into the holder 300 through the opened side of the holder 300, a cover 320 is coupled to the other opened side of the holder 300 to complete the exterior of the battery pack 10, thus enclosing and preventing recognition of the gap 400 from outside. That is, by preventing the gap 400 from being exposed to the outside by the cover 320, the arbitrary disassembling of the battery pack 10 (e.g., by a user) may be prevented, thus preventing a safety accident.

Figure 4:
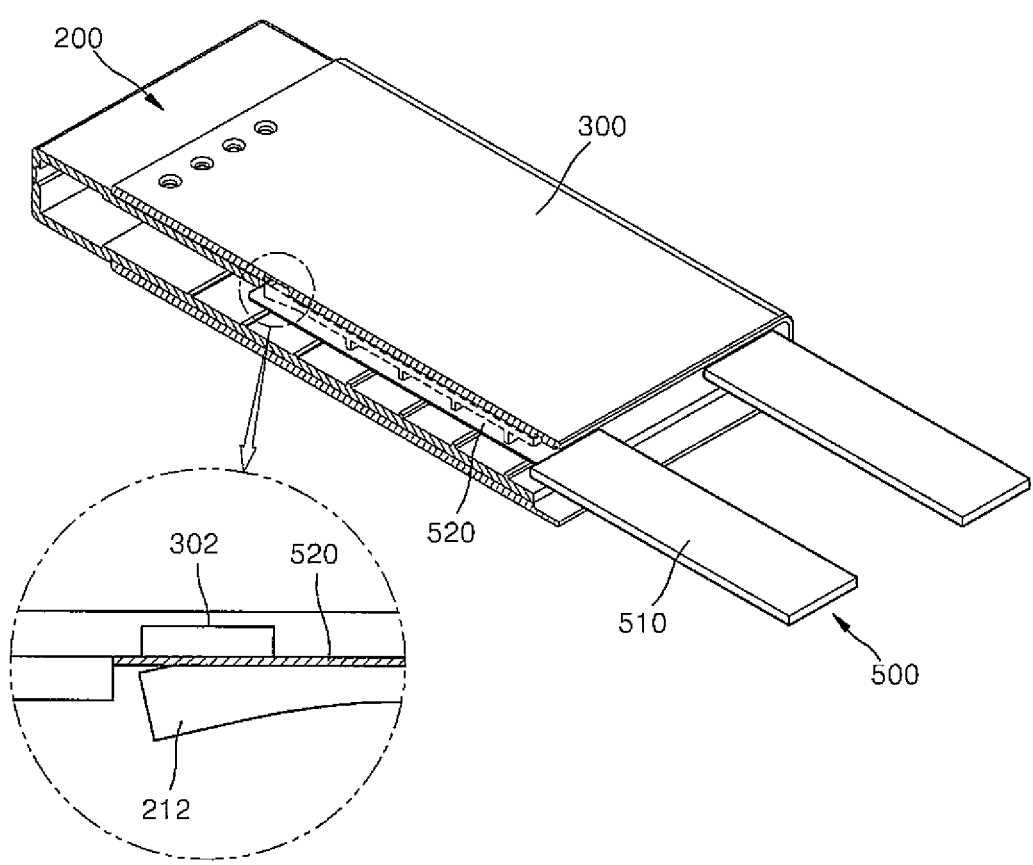
FIG. 4 is a perspective view schematically illustrating a disassembling process of a battery pack of FIG. 1.

FIG. 4 is a perspective view schematically illustrating a disassembling process of the battery pack 10 of FIG. 1.

In FIG. 4, like in FIG. 3, the battery cell (110 of FIG. 1) and the protection circuit module (120 of FIG. 1) in the case 200 coupled with the holder 300 are not shown.

Referring to FIG. 4, the gap (e.g., the gap 400 of FIG. 3) between the case 200 and the holder 300 may be formed as a substantially linear path or groove from one end of the holder 300 to the first engagement portion 212. The number of gaps is the same as the number of first engagement portions 212 on the first case 210. That is, there may be one gap or two or more gaps (400 of FIG. 3) based on the number of first engagement portions 212.

The disassembling kit 500 may be inserted into the gap (400 of FIG. 3). The disassembling kit 500 includes a grip portion 510 and an insertion portion 520, and the insertion portion 520 is inserted into the gap (400 of FIG. 3). Once the disassembling kit 500 is inserted into the gap (400 of FIG. 3), the holder 300 and the case 20 may be separated from each other.

More specifically, after the cover (320 of FIG. 3) is separated (or removed) from the holder 300, then the insertion portion 520 of the disassembling kit 500 is inserted into the gap (400 of FIG. 3). The insertion portion 520 inserted into the gap (400 of FIG. 3) pushes the inclined surface of the first engagement portion 212, and the first engagement portion 212 is pressed downwardly by the insertion portion 520 because the first engagement portion has elasticity. Thus, when the disassembling kit 500 is inserted into the gap (400 of FIG. 3), coupling between the first engagement portion 212 and the second engagement portion 302 is released, thus easily separating the case 200 and the holder 300.

That is, according to the embodiments of the present invention, when the battery pack 10 is re-assembled due to, for example, a failure of the assembled battery pack 10, or when disassembly is desired for repair due to occurrence of abnormality during the use of the battery pack 10, the case 200 and the holder 300 may be easily disassembled without damaging the case 200 and the holder 300. Moreover, as described above, the case 200 is made by coupling the first case 210 and the second case 220 based on hook coupling, such that the first case 210 and the second case 220 may also be easily separated from each other. Therefore, the case 200 and the holder 300 may be recycled.

Furthermore, when the case 200 and the holder 300 are coupled, the first engagement portion 212 and the second engagement portion 302 may not be easily recognized from outside, thereby preventing, for example, the user from arbitrarily disassembling the battery pack 10 and thus preventing a safety accident.

As described above, according to an embodiment of the present invention, by preventing a user from arbitrarily disassembling a battery pack, a safety accident may be prevented.

Moreover, the battery pack may be easily separated for repair of the battery pack, and the case or the holder may be recycled.

While the example embodiments of the present invention are shown and described, the embodiments of the present invention is not limited to the example embodiments described above, and can be implemented in various modifications by those skilled in the art to which the present invention pertains without departing from the subject matter of the embodiments of the present invention claimed in the appended claims and their equivalents, and such modifications should not be understood to depart from the technical spirit or prospect of the embodiments of the present invention.

What is claimed is:

1. A battery pack comprising:
    a battery cell;
    a case comprising a first case having a hook formed therein, and a second case having a lock hole formed therein, such that the first and second case are configured to be releasably hook coupled with each other, the case accommodating the battery cell therein;
    a holder enclosing the case, and comprising a pair of major surfaces facing each other along a major axis of the holder, each of the major surfaces having a greater surface area than any other surface of the holder that is orthogonal thereto;
    a first engagement portion at an outer surface of at least one of the first case and the second case;
    a second engagement portion at an inner surface of one of the pair of the major surfaces of the holder for coupling with the first engagement portion; and
    a gap between the inner surface of the holder and the outer surface of the at least one of the first case and the second case at which the first engagement portion is located, the gap being formed substantially straight from an end of the holder to the second engagement portion, and being defined on one side by the holder and on three sides by the outer surface of the at least one of the first case and the second case at which the first engagement portion is located,
    wherein a depth of the second engagement portion is less than a thickness of an edge portion of the first engagement portion that is coupleable with the second engagement portion,
    wherein the first engagement portion comprises a lock protrusion separated from the at least one of the first case and the second case and protruding away from the outer surface,
    wherein the second engagement portion comprises a recessed portion configured to couple with the lock protrusion,
    wherein the gap is configured such that a disassembling kit is insertable into the gap to contact the first engagement portion, and
    wherein the holder and the case are configured to separate from each other when the disassembling kit is inserted into the gap and moves the first engagement portion.

2. The battery pack of claim 1, wherein the holder has a cavity for inserting the case such that, when the case is inserted into the cavity, the coupled first engagement portion and the second engagement portion prevent the case from separating from the holder in a direction opposite to an inserting direction of the case.

3. The battery pack of claim 1, further comprising a bump on a side of the case and protruding outwardly from the case such that, when the case is inserted into a cavity of the holder, the bump prevents the case from separating from the holder in an inserting direction of the case.

4. The battery pack of claim 1, wherein the first engagement portion comprises a plurality of first engagement portions, and the second engagement portion comprises a plurality of second engagement portions.

5. The battery pack of claim 1, further comprising a protection circuit module accommodated in the case and electrically coupled with the battery cell.

6. The battery pack of claim 5, wherein the protection circuit module comprises an external connection terminal.

7. A battery pack comprising:

a holder having a cavity, and comprising a pair of major surfaces facing each other along a major axis of the holder, each of the major surfaces having a greater surface area than any surface of the holder that is orthogonal thereto;

a case inserted into the cavity and coupled with the holder, the case comprising a first case having a hook formed therein, and a second case having a lock hole formed therein, such that the first and second case are configured to be releasably hook coupled with each other;

a battery cell accommodated in the case; and a gap between an inner surface of the holder and an outer surface of the at least one of the first case and the second case at which a first engagement portion is located, the gap being formed substantially straight from an end of the holder to a second engagement portion at an inner surface of one of the major surfaces of the holder for coupling with the first engagement portion, and being defined on one side by the holder and on three sides by the outer surface of the at least one of the first case and the second case at which the first engagement portion is located, wherein a depth of the second engagement portion is less than a thickness of an edge portion of the first engagement portion that is coupleable with the second engagement portion, wherein the holder and the case are configured to separate from each other when a disassembling kit is inserted into the gap, wherein the first engagement portion comprises a lock protrusion separated from the at least one of the first case and the second case and protruding away from the outer surface, wherein the second engagement portion comprises a recessed portion configured to couple with the lock protrusion, wherein the gap is configured such that a disassembling kit is insertable into the gap, and wherein the holder and the case are configured to separate from each other when the disassembling kit is inserted into the gap.

8. The battery pack of claim 7, wherein the coupled first engagement portion and the second engagement portion prevent the case from separating from the holder in a direction opposite to an inserting direction of the case.

9. The battery pack of claim 8, wherein the first engagement portion is elastic such that the coupled first engagement portion and the second engagement portion are configured to uncouple from each other when the disassembling kit is inserted in the gap.

10. The battery pack of claim 7, further comprising a bump protruding outward from the case at a side of the case.

11. The battery pack of claim 10, wherein the bump is configured to prevent the case from separating from the holder in an inserting direction of the case.

12. The battery pack of claim 8, wherein the first engagement portion comprises a plurality of first engagement portions, and the second engagement portion comprises a plurality of second engagement portions.

13. The battery pack of claim 7, further comprising a protection circuit module accommodated in the case and electrically coupled with the battery cell.

14. The battery pack of claim 13, wherein the protection circuit module further comprises:

an external connection terminal; and a temperature sensor for measuring a temperature of the battery cell.

* * * * *